(12) United States Patent
Sakurai

(10) Patent No.: US 10,853,595 B2
(45) Date of Patent: Dec. 1, 2020

(54) READING APPARATUS

(71) Applicant: TOSHIBA TEC KABUSHIKI KAISHA, Tokyo (JP)

(72) Inventor: Wataru Sakurai, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 16/184,655

(22) Filed: Nov. 8, 2018

(65) Prior Publication Data

US 2019/0138772 A1    May 9, 2019

(30) Foreign Application Priority Data

Nov. 9, 2017   (JP) .................................. 2017-216388

(51) Int. Cl.
*G06K 7/08* (2006.01)
*G06K 7/10* (2006.01)

(52) U.S. Cl.
CPC ..... *G06K 7/10366* (2013.01); *G06K 7/10316* (2013.01); *G06K 7/10356* (2013.01); *G06K 7/10415* (2013.01)

(58) Field of Classification Search
CPC .......... G06K 7/10366; G06K 7/10316; G06K 7/10356; G06K 7/10415
USPC ................................ 235/451, 379, 440, 492
See application file for complete search history.

(56) References Cited

U.S. PATENT DOCUMENTS

| 8,451,125 B2 | 5/2013 | Hong et al. |
| 2011/0233283 A1* | 9/2011 | Hansen ............ G06K 19/07728 235/492 |
| 2015/0048164 A1* | 2/2015 | Slutsky .............. G06K 7/10732 235/440 |
| 2017/0224438 A1 | 8/2017 | Johnson et al. |

FOREIGN PATENT DOCUMENTS

| CN | 102054156 A | 5/2011 |
| EP | 1 487 126 A1 | 12/2004 |

(Continued)

OTHER PUBLICATIONS

Search Report dated Mar. 26, 2019 received in corresponding European application No. 18 20 5139.1, 6 pages.

(Continued)

*Primary Examiner* — Karl D Frech
(74) *Attorney, Agent, or Firm* — Foley & Lardner LLP

(57) ABSTRACT

A reading apparatus for reading commodity information relating to a commodity from a RFID tag attached to the commodity includes a placement section, a first antenna, one or more second antennas, a reflection member, and a reading controller. The placement section is configured to support the commodity. The first antenna is configured to emit radio waves in a direction facing the placement section. The one or more second antennas are arranged below the first antenna in such a manner that a direction of an emitting plane from which radio waves are emitted is different from that of the emitting plane of the first antenna 15. The reflecting member is configured to reflect radio waves emitted from the one or more second antennas. A reading controller is configured to read the commodity information from the RFID tag of each commodity placed on the placement section with at least one of the first antenna or the one or more second antennas.

18 Claims, 7 Drawing Sheets

(56) References Cited

FOREIGN PATENT DOCUMENTS

| | | | |
|---|---|---|---|
| EP | 2 320 349 | A2 | 5/2011 |
| JP | 4887183 | B | 12/2011 |
| WO | WO-2008/155937 | A1 | 12/2008 |

OTHER PUBLICATIONS

Office Action dated Sep. 3, 2020 received in corresponding Chinese Application No. 201811325186.2, 11 pages.

* cited by examiner

READING APPARATUS

CROSS-REFERENCE TO RELATED APPLICATION

This application is based upon and claims the benefit of priority from Japanese Patent Application No. 2017-216388, filed on Nov. 9, 2017, the entire contents of which are incorporated herein by reference.

FIELD

Embodiments described herein relate generally to a reading apparatus.

BACKGROUND

A conventional commodity sales processing apparatus which reads commodity information from a RFID (Radio Frequency IDentifier) tag (RFID chip) attached to each commodity and performs sales registration and checkout processing based on the commodity information is known. In such a commodity sales processing apparatus, for example, a reading apparatus has been proposed which collectively reads commodity information after a commodity or a shopping basket for accommodating commodities is placed on an upper surface of a checkout counter in which a planar antenna is embedded.

In recent years, in more and more retail stores, the above commodity sales processing apparatus is installed as a self-checkout apparatus (self-service POS (Point Of Sales) device, self-registration apparatus) for a customer to perform sales registration and checkout processing on a commodity to be purchased, and a customer performs the sales registration and the checkout processing on a commodity. The self-checkout apparatus is also used, for example, in a checkout system in a cafeteria of a self-service type.

Since such a self-checkout apparatus can collectively read the commodity information from RFID tags, it is possible to shorten the reading time when compared with an existing self-checkout apparatus. However, due to variation in characteristics of RFID tags or performance of a tag, a directivity of the tag, an overlap of tags, an influence of a commodity to which the tag is attached, conditions of surrounding fixtures and the like, the commodity information cannot be completely read even within a communication range in which the appropriately set commodity information can be read.

On the other hand, for example, if an output of a reader is increased to completely read the commodity information, the communication range expands, but there is a possibility of erroneously reading information of a RFID tag which is not desired to be read, and thus, the adjustment of the output of the reader is difficult. Although there is a device that controls the reading range by using a shielding plate, a radio wave absorber, etc., there is a problem that there is a RFID tag which cannot be read and much time is taken in finding a RFID tag that cannot be read. On the other hand, in the self-checkout apparatus, the communication range can be reduced by narrowing the output and the commodity information can be read one by one, but the reading time cannot be shortened.

DESCRIPTION OF THE DRAWINGS

FIG. 4-1 is a diagram illustrating an example of an arrangement of RFID antennas;

FIG. 4-2 is a diagram illustrating an example of an arrangement of RFID antennas;

FIG. 5-1 is a diagram illustrating an example of an arrangement of RFID antennas;

FIG. 5-2 is a diagram illustrating an example of an arrangement of RFID antennas;

DETAILED DESCRIPTION

In accordance with at least one embodiment, a reading apparatus for reading commodity information relating to a commodity from a wireless tag attached to the commodity comprises a placement section configured to place the commodity; a first antenna configured to emit radio waves in a direction facing the placement section; one or more second antennas arranged below the first antenna in such a manner that a direction of an emitting plane from which radio waves are emitted is different from that of the emitting plane of the first antenna; a reflection member configured to reflect radio waves emitted from the second antenna; and a reading controller configured to read the commodity information from the wireless tag of each commodity placed on the placement section with at least one of the first antenna and the second antenna.

Figure 1:
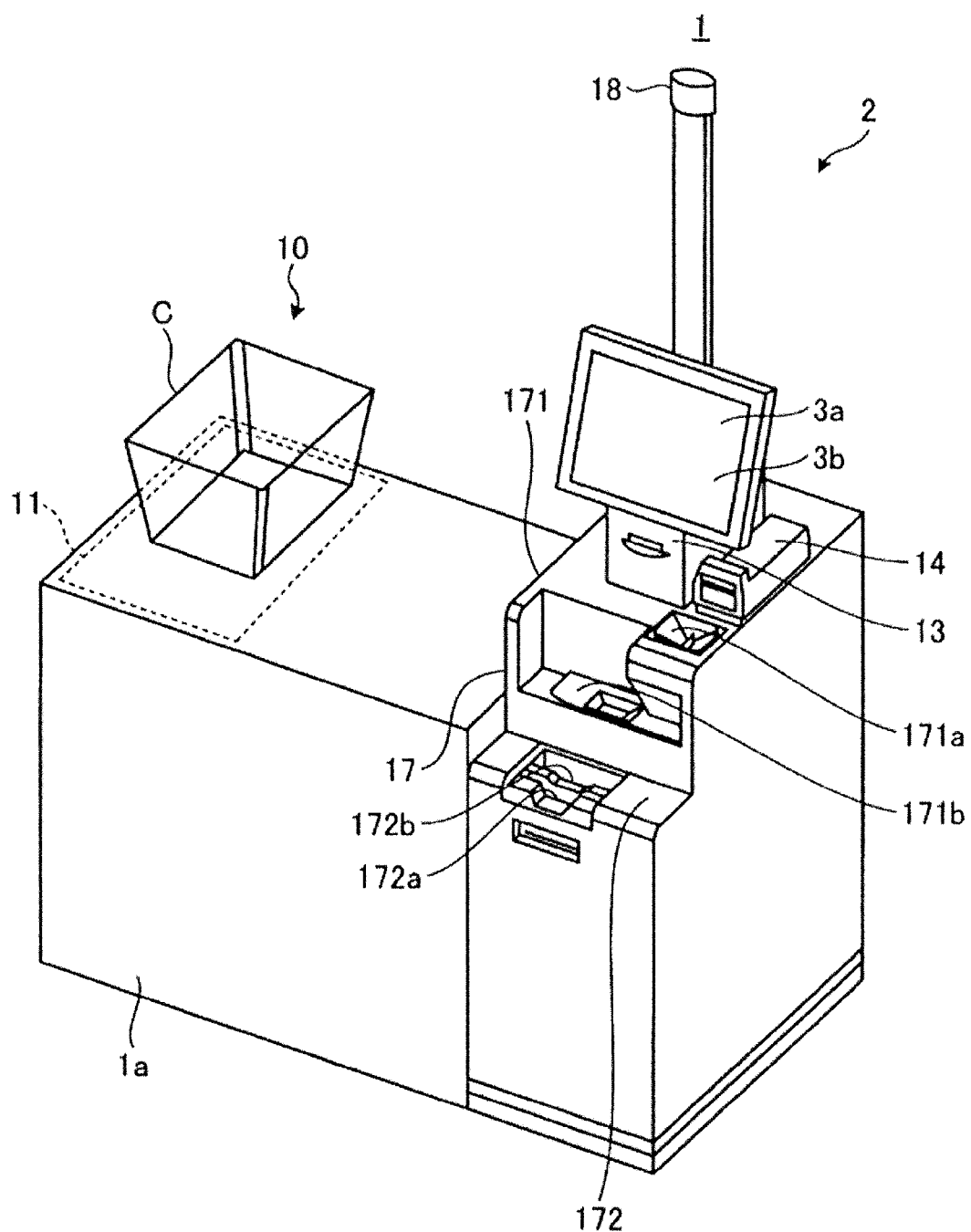
FIG. 1 is a perspective view illustrating an external arrangement of a self-checkout apparatus according to at least one embodiment.

FIG. 1 is a perspective view illustrating an external configuration of a self-checkout apparatus according to at least one embodiment. A self-checkout apparatus 1 is a commodity sales processing apparatus that a customer uses to perform sales registration and checkout processing on a commodity. The self-checkout apparatus 1 is installed in, for example, a retail store such as a supermarket or a clothing store.

The self-checkout apparatus 1 includes a reading apparatus 10 which reads commodity information relating to a commodity from a RFID tag attached to the commodity, and a checkout processing apparatus 2 which performs checkout processing based on the read commodity information. The RFID tag is an example of a wireless tag.

First, the checkout processing apparatus 2 is described. As shown in FIG. 1, the checkout processing apparatus 2 includes a display 3b, a touch panel 3a, a printer 13, a card reader 14, a settlement unit 17, and a warning lamp 18.

The display 3b is a display device such as an LCD (Liquid Crystal Display). The display 3b displays various screens relating to sales registration and checkout of a commodity under the control of a controller 20 described later. FIG. 1 shows an example in which the display 3b is provided above the settlement unit 17 (above the printer 13 in FIG. 1), but an installation position of the display 3b is not limited thereto.

A touch panel 3a is provided on a display surface of the display 3b. The touch panel 3a receives an operation input from an operator and outputs the input operation content to the controller 20. In at least one embodiment, the touch panel 3a is provided as an operation section, but the present invention is not limited thereto, and the operation input may be performed with a hardware keyboard or the like.

The printer 13 is a printing device such as a thermal printer. The printer 13 issues a receipt indicating a transaction content of one transaction by printing the transaction content on a predetermined sheet under the control of the controller 20.

The card reader 14 reads information from a card-type recording medium and outputs it to the controller 20 described later. For example, the card reader 14 reads a user identifier for identifying a customer from a member card possessed by the customer. The card reader 14 reads information stored in a credit card used for settlement.

The settlement unit 17 performs sales registration on a commodity purchased by a customer based on information read by a reader/writer 31 described later. The settlement unit 17 performs settlement processing on a commodity whose sales is registered according to deposit and dispensing of cash or transmission and reception of information instead of the deposit and dispensing of cash.

The settlement unit 17 includes a coin change machine 171 and a bill change machine 172. The coin change machine 171 discriminates whether coins inserted through a coin insertion slot 171a are authentic, stores authentic coins, and dispenses coins as a change from a coin discharge port 171b. The coin insertion slot 171a is a slot through which coins are inserted. The coin discharge port 171b is used for discharging coins.

The bill change machine 172 discriminates whether bills inserted through a bill insertion slot 172a are authentic, stores the authentic bills, and dispenses bills as a change from a bill discharge port 172b. The bill insertion slot 172a is a slot through which bills are inserted. The bill discharge port 172b is used for discharging bills.

The coin change machine 171 and the bill change machine 172 notify the controller 20 of a deposit cash amount. The coin change machine 171 and the bill change machine 172 receive notification of an amount to be dispensed as a change from the controller 20.

Under the control of the controller 20 described later, the warning lamp 18 notifies occurrence of situations for which an operation of a store clerk is required with blinking of light to surrounding persons.

The reading apparatus 10 is described below. The reading apparatus 10 for reading a RFID tag attached to a commodity is provided on the left side of the checkout processing apparatus 2 in a direction facing the display 3b. The reading apparatus 10 is connected to the checkout processing apparatus 2 by a cable (not shown) or the like, and outputs (transmits) the commodity information read from the RFID tag attached to the commodity to the checkout processing apparatus 2.

Specifically, it is assumed that a RFID tag in which a commodity code or the like for identifying a commodity is recorded is attached to each commodity. In the RFID tag, there is a storage area for writing a registration completion flag described later. The writing of the registration completion flag is to prevent a commodity from being taken out of the retail store while being unsettled. Whether the registration completion flag is determined by a gate installed at an entrance or exit of the retail store, and if there is no registration completion flag, a warning is issued by a notifying module such as a buzzer or the like.

The reading apparatus 10 is provided with a placement section 11 for placing a commodity or a shopping basket C for accommodating commodities on an upper surface of a counter 1a of the self-checkout apparatus 1. In FIG. 1, the shopping basket C is placed on the placement section 11, but the commodity may be placed as it is.

Planar RFID antennas 15a, 15b and 15c (refer to FIG. 4-1 to FIG. 6 etc.) are embedded in the counter 1a below the placement section 11. In the present embodiment, the RFID antennas 15a, 15b, and 15c are collectively referred to as RFID antennas 15 if they are not distinguished from each other. The RFID antenna is an example of an antenna.

The RFID antenna 15 communicates with an RFID tag present above the placement section 11, i.e., an RFID tag attached to each commodity accommodated in the shopping basket C by emitting radio waves such as a UHF (Ultra High Frequency) band. In the present embodiment, two or three RFID antennas 15 are provided, but the number of RFID antennas 15 is not limited thereto.

According to the reading apparatus 10 having such a configuration, it is possible to collectively read RFID tags attached to commodities in the shopping basket C by placing the shopping basket C on the placement section 11. The arrangement of the RFID antenna 15 is described later (refer to FIG. 4-1 to FIG. 6).

Figure 2:
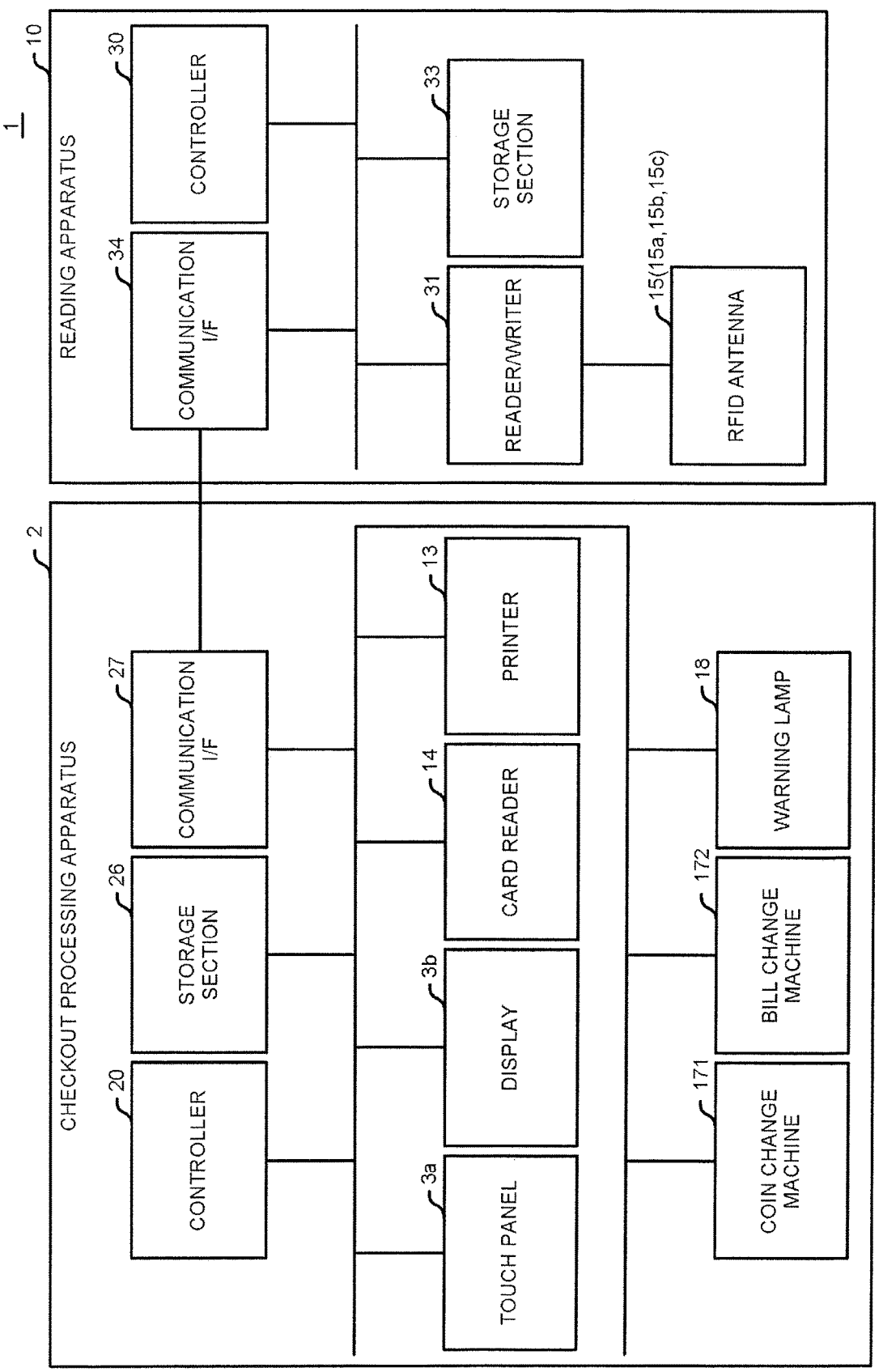
FIG. 2 is a diagram illustrating a hardware arrangement of the self-checkout apparatus according to at least one embodiment.

Next, a hardware configuration of the self-checkout apparatus 1 is described. FIG. 2 is diagram illustrating a hardware configuration of the self-checkout apparatus according to the embodiment.

The checkout processing apparatus 2 includes the controller 20 having a computer configuration including a CPU (Central Processing Unit), a ROM (Read Only Memory), a RAM (Random Access Memory) and the like. The ROM stores various programs to be executed by the CPU and various kinds of data. The RAM temporarily stores data and programs when the CPU executes various programs.

The controller 20 is connected to the touch panel 3a, the display 3b, the printer 13, the card reader 14, the coin change machine 171, the bill change machine 172, and the warning lamp 18 via various input/output circuits (not shown).

The card reader 14 reads information from a point card or a credit card of a user (customer) inserted from a card insertion slot. The printer 13 prints a receipt after the checkout processing is performed, and then issues it from a receipt issuing port. The coin change machine 171 processes coins inserted through the coin insertion slot 171a and discharged to the coin discharge port 171b. The bill change machine 172 processes bills deposited through the bill insertion slot 172a and discharged from the bill discharge port 172b.

A storage section 26 and a communication I/F (interface) are connected to the controller 20 via various input/output circuits (not shown).

The storage section 26 includes a nonvolatile storage medium such as an HDD (Hard Disk Drive) or an SSD (Solid State Drive). The storage section 26 stores various programs and various kinds of data relating to operations performed by the checkout processing apparatus 2. The data stored in the storage section 26 includes, for example, a commodity master file in which information relating to each commodity is registered in association with a commodity code for identifying the commodity. The information relating to such a commodity includes, for example, a commodity name and a price of the corresponding commodity. The communication I/F 27 is used to transmit and receive various kinds of data to and from the reading apparatus 10.

Meanwhile, the reading apparatus 10 includes the controller 30 having a computer configuration constituted by a CPU, a ROM, a RAM and the like. The ROM stores various programs to be executed by the CPU and various kinds of data. The RAM temporarily stores data and programs when the CPU executes various programs.

The reader/writer 31, a storage section 33 and a communication I/F 34 are connected to the controller 30 via various input/output circuits (not shown).

The reader/writer 31 transmits modulated waves (radio waves) for reading and writing the RFID tag with the RFID antennas 15 (15a to 15c). The reader/writer 31 outputs various kinds of information (e.g., the commodity information) read from the RFID tag via at least one RFID antenna 15 to the controller 30. The reader/writer 31 writes the information in the RFID tag by outputting information to be written (e.g., flag information) via the RFID antenna 15.

The storage section 33 includes a nonvolatile storage medium such as an HDD or an SSD. The storage section 33 stores various programs and various kinds of data relating to operations performed by the reading apparatus 10. The communication I/F 34 is used to transmit and receive various kinds of data to and from the checkout processing apparatus 2.

Figure 3:
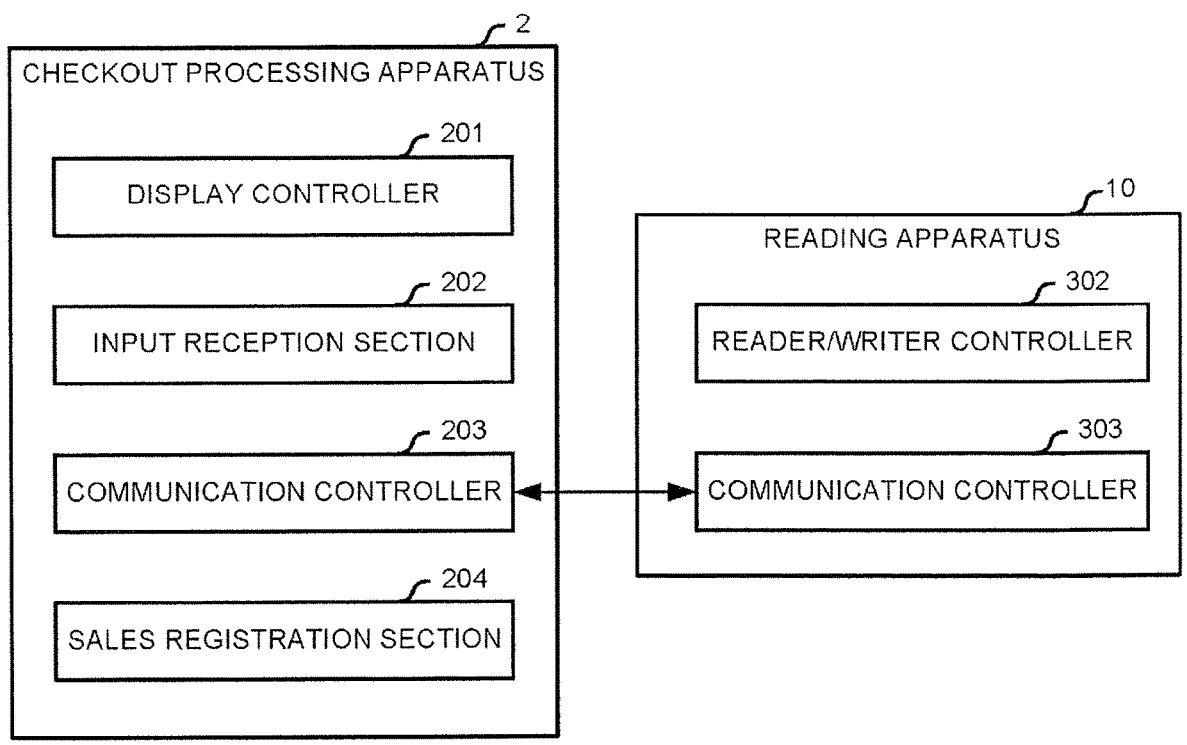
FIG. 3 is a block diagram illustrating functional components of the self-checkout apparatus.

Next, the functional configuration of the self-checkout apparatus 1 is described. FIG. 3 is a block diagram illustrating functional components of the self-checkout apparatus.

The controller 20 (CPU) of the checkout processing apparatus 2 executes the program stored in the storage section 26 to function as a display controller 201, an input reception section 202, a communication controller 203 and a sales registration section 204.

The display controller 201 controls the display 3b to display various screens on the display 3b. For example, the display controller 201 displays a screen including an operator (hereinafter, referred to as a reading start button) for instructing to start reading the commodity code (RFID tag) and an operator (hereinafter, referred to as a reading termination button) for instructing termination of the reading. Based on the commodity code transmitted from the reading apparatus 10, the display controller 201 reads out the commodity information associated with the commodity code from the commodity master file and displays a commodity name, a price, a deposit amount, a change amount, etc. of the commodity.

The input reception section 202 receives an operation input via the touch panel 3a. For example, if an operator on an operation screen displayed on the display 3b is operated (touched), the input reception section 202 outputs instruction information corresponding to the operator to the controller 20.

The communication controller 203 controls the communication I/F 27 to transmit and receive various kinds of information to and from the reading apparatus 10 via the communication I/F 27. For example, when the reading start button is operated, the communication controller 203 transmits a reading start instruction instructing the start of reading to the reading apparatus 10. The communication controller 203 receives a commodity code transmitted from the reading apparatus 10. When the reading termination button is operated, the communication controller 203 transmits a reading termination instruction instructing termination of reading to the reading apparatus 10. If the sales registration by the sales registration section 204 is completed, the communication controller 203 transmits a registration completion instruction instructing completion of the registration to the reading apparatus 10.

The sales registration section 204 performs sales registration for registering commodities specified by commodity codes transmitted from the reading apparatus 10 as commodities purchased by a customer if payment of a price is confirmed in a settlement processing. Specifically, the sales registration section 204 registers the commodity codes for specifying the commodities in a database for registration, together with the deposit amount, the change amount, and the transaction date and time. The database for registration may be included in the storage section 26 of the checkout processing apparatus 2 or may be provided in an external device communicable with the checkout processing apparatus 2.

On the other hand, the controller 30 (CPU) of the reading apparatus 10 executes the program stored in the storage section 33 to function as a reader/writer controller 302 and a communication controller 303.

The reader/writer controller 302 controls the reader/writer 31 to read the RFID tag attached to the commodity and write it to the RFID tag. The reader/writer controller 302 is an example of a reading controller.

Specifically, when the reading start instruction from the checkout processing apparatus 2 is received, the reader/writer controller 302 starts reading the commodity information from the RFID tag. As a result, since the reading of the commodity is started in response to the input of the reading start instruction, a customer can recognize a reading start timing with the reading apparatus 10.

When the reading termination instruction from the checkout processing apparatus 2 is received, the reader/writer controller 302 terminates reading by the reader/writer 31. When the registration completion instruction from the checkout processing apparatus 2 is received, the reader/writer controller 302 controls the reader/writer 31 to start writing the registration completion flag. Here, the registration completion flag is information indicating that the sales registration is completed, and is written in a predetermined storage area of the RFID tag.

The communication controller 303 controls the communication I/F 34 to transmit and receive various kinds of information to and from the checkout processing apparatus via the communication I/F 34. For example, the communication controller 303 receives the reading start instruction transmitted from the checkout processing apparatus 2. The communication controller 303 transmits the commodity code read by the reader/writer controller 302 from the RFID tag to the checkout processing apparatus 2. The communication controller 303 receives the reading termination instruction transmitted from the checkout processing apparatus 2. The communication controller 303 receives the registration completion instruction transmitted from the checkout processing apparatus 2.

In such a self-checkout apparatus 1, if the shopping basket C is placed on the placement section 11 and the input reception section 202 of the checkout processing apparatus 2 receives an input of the reading start instruction from a user who is a customer, the communication controller 203 transmits the reading start instruction to the reading apparatus 10. If the communication controller 303 of the reading apparatus 10 receives the reading start instruction, the reader/writer controller 302 reads the commodity information from the RFID tag attached to the commodity in the shopping basket C placed on the placement section 11. If the reading of the commodity is completed, the input reception section 202 of the checkout processing apparatus 2 receives an input of the reading termination instruction by the user, and the communication controller 203 transmits the reading termination instruction to the reading apparatus 10. If the communication controller 303 of the reading apparatus 10 receives the reading termination instruction, the reader/ writer controller 302 stops reading the commodity information. Thereafter, the checkout processing is performed in the checkout processing apparatus 2.

Figures 1, 4:
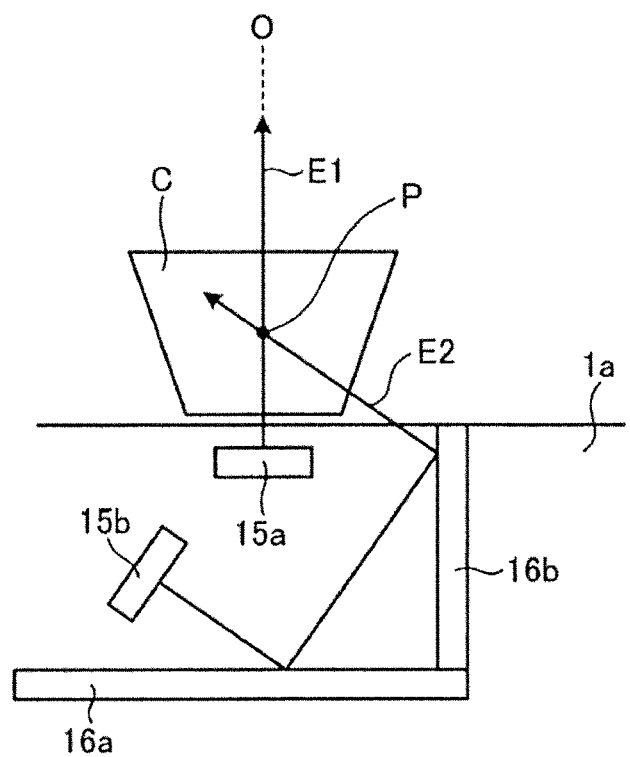
Figures 2, 4:
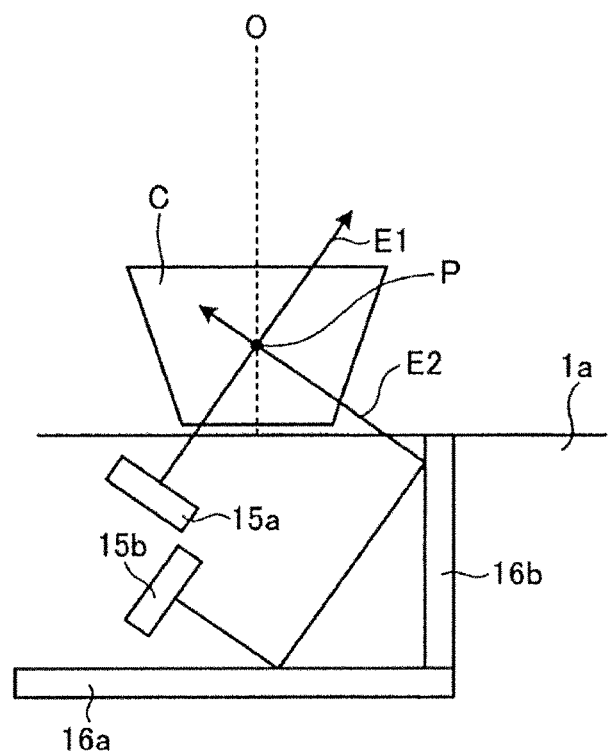

Next, an arrangement example of the RFID antennas 15a, 15b and 15c embedded below the placement section 11 is described. FIG. 4-1, FIG. 4-2, FIG. 5-1, FIG. 5-2, FIG. 6 and FIG. 7 are diagrams illustrating examples of arrangement of the RFID antennas. In FIG. 4-1 to FIG. 5-2 and FIG. 7, two RFID antennas 15a and 15b are arranged, and in FIG. 6, three RFID antennas 15a, 15b and 15c are arranged. FIG. 4-1 to FIG. 7 are sectional views taken along a line passing through a center point of the placement section and parallel to a longitudinal direction of the counter 1a, which are diagrams viewed from a direction facing the display 3b. In FIG. 4-1 to FIG. 7, central axes in an emission direction of radio waves E1, E2 and E3 respectively emitted from the RFID antennas 15a, 15b and 15c are indicated by arrows, and a communication range of radio waves is determined based on intensity thereof. In the present embodiment, two or three RFID antennas 15 are provided, but the number of RFID antennas is not limited, and four or more RFID antennas 15 may be provided.

The RFID antenna 15a of at least one embodiment is provided in the counter 1a and below the placement section 11, and emits radio waves directly upwards with respect to the placement section 11. Therefore, the RFID antenna 15a emits radio waves in a direction facing the placement section 11. The RFID antenna 15a is an example of a first antenna. The RFID antennas 15b and 15c are provided in the counter 1a and below the placement section 11. The RFID antennas 15b and 15c are provided under the RFID antenna 15a in such a manner that the direction of an emitting plane from which the radio waves are emitted differs from the direction of the emitting plane of the RFID antenna 15a. The RFID antennas 15b and 15c are examples of a second antenna.

The radio waves emitted from the RFID antenna 15a intersect with radio waves emitted from the RFID antennas 15b and 15c. Furthermore, the RFID antenna 15a and the RFID antennas 15b and 15c are arranged in such a manner that an intersection point P at which the radio waves emitted from the RFID antenna 15a and the radio waves emitted from the RFID antennas 15b and 15c intersect with each other is positioned on a center line O extending upwards from the center point of the placement section 11.

The reading apparatus 10 of at least one embodiment has a reflecting plate 16 for reflecting radio waves emitted from the RFID antenna 15 to irradiate the commodity placed on the placement section 11. Like the RFID antenna 15, the reflecting plate 16 is also embedded in the counter 1a and below the placement section 11. According to the present embodiment, one or two of the reflecting plates 16a, 16b, 16c, 16d and 16e are provided according to the configuration, but they are referred to as the reflecting plates 16 if they are not distinguished from each other. The reflecting plate is an example of a refection member. The specific arrangement of the RFID antennas 15a, 15b and 15c is described with reference to the respective drawings.

In FIG. 4-1, the RFID antenna 15a is provided below the placement section 11 in such a manner that the emitting plane from which the radio waves E1 are emitted is parallel to an upper surface of the counter 1a of the self-checkout apparatus 1. The RFID antenna 15a is arranged in such a manner that the emitting plane thereof faces a bottom surface of the shopping basket C and a center axis of the radio waves E1 passes through the center point of the placement section 11. Therefore, the radio waves E1 from the RFID antenna 15a passes through the center point of the placement section 11 and is emitted upwards perpendicular to the upper surface of the counter 1a as indicated by the arrow. In this way, the RFID antenna 15a emits radio waves directly to the shopping basket C placed on the placement section 11.

In the counter 1a, the reflecting plate 16a parallel to the upper surface of the counter 1a is arranged at a lower part, and the reflecting plate 16b orthogonal to the upper surface of the counter 1a is arranged at one end side (the right side of the shopping basket C in FIG. 4-1) with respect to the shopping basket C. The RFID antenna 15b is arranged at the other end side (the left side of the shopping basket C in FIG. 4-1) with respect to the shopping basket C in such a manner that the emitting plane from which the radio waves E2 are emitted is inclined downwards. The radio waves E2 from the RFID antenna 15b is first directed obliquely downwards, reflected by the reflecting plate 16a, and then reflected by the reflecting plate 16b, and in this way, the radio waves E2 are emitted obliquely upwards from one end side where the reflecting plate 16b is positioned to the other end side with respect to the shopping basket C.

The RFID antennas 15a and 15b are arranged in such a manner that an intersection point P between the radio waves E1 emitted from the RFID antenna 15a and the radio waves E2 emitted from the RFID antenna 15b is positioned on the center line O extending upwards from the center point of the placement section 11. In this case, it is desirable that an angle formed by the radio waves E1 and E2 from the RFID antennas 15a and 15b is close to a right angle (90 degrees). As a result, the shopping basket C is within the communication range of the radio waves E1 and E2 which are emitted from the RFID antennas 15a and 15b and intersect with each other.

From the above, since the commodities accommodated in the shopping basket C are irradiated with the radio waves E1 and E2 emitted from the RFID antennas 15a and 15b from different directions, the commodity information can be easily read from the commodities.

In FIG. 4-2, the RFID antenna 15b and the reflecting plates 16a and 16b are arranged at the same positions as those in FIG. 4-1.

The RFID antenna 15a is arranged below the placement section 11 in such a manner that the emitting plane from which the radio waves E1 are emitted is inclined upwards on one end side on which the reflecting plate 16b is arranged. Therefore, the radio waves E1 from the RFID antenna 15 are emitted obliquely upwards towards the reflecting plate 16b side as indicated by the arrow. In this way, the RFID antenna 15a emits radio waves directly to the shopping basket C placed on the placement section 11.

The RFID antennas 15a and 15b are arranged in such a manner that an intersection point P between the radio waves E1 emitted from the RFID antenna 15a and the radio waves E2 emitted from the RFID antenna 15b is positioned on the center line O extending upwards from the center point of the placement section 11. In this case, it is desirable that an angle formed by the radio waves E1 and E2 from the RFID antennas 15a and 15b is close to a right angle. As a result, the shopping basket C is within the communication range of the radio waves E1 and E2 which are emitted from the RFID antennas 15a and 15b and intersect with each other.

From the above, since the commodities accommodated in the shopping basket C are irradiated with the radio waves E1 and E2 emitted from the RFID antennas 15a and 15b from different directions, the commodity information can be easily read from the commodities.

Figures 1, 5:
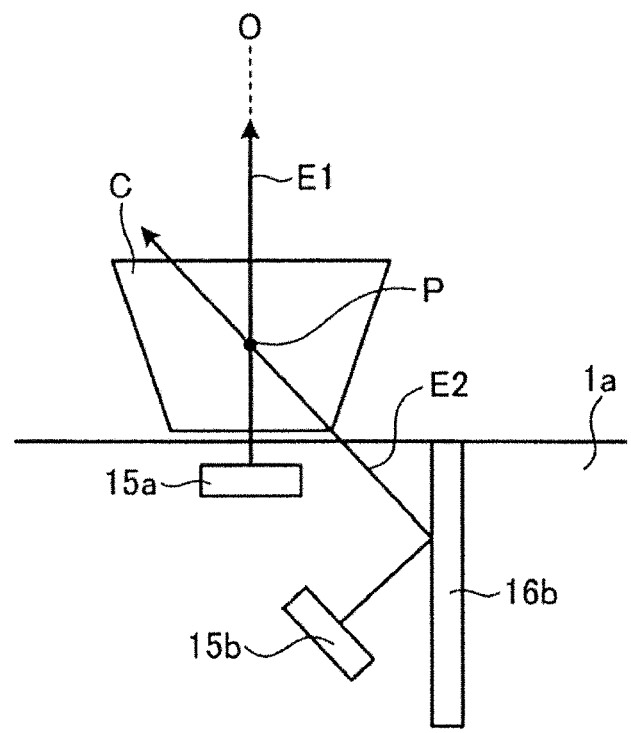
Figures 2, 5:
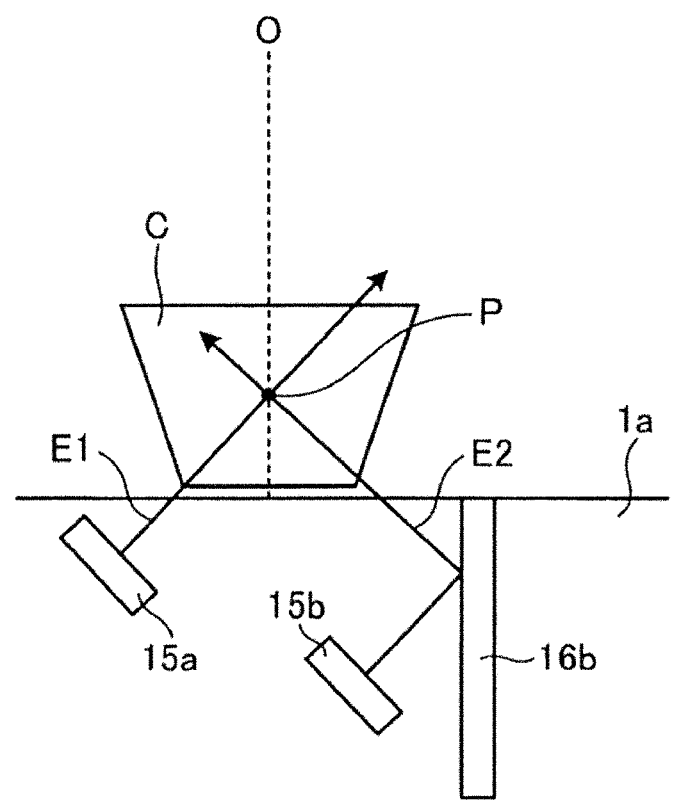

In FIG. 5-1, the RFID antenna 15a is arranged at the same position as that in FIG. 4-1.

In the counter 1a, the reflecting plate 16b orthogonal to the upper surface of the counter 1a is arranged at one end side (the right side of the shopping basket C in FIG. 5-1) with respect to the shopping basket C. The RFID antenna 15b is arranged at one end side in such a manner that the emitting plane from which the radio waves E2 are emitted is inclined upwards. The radio waves E2 from the RFID antenna 15b are reflected by the reflecting plate 16b as indicated by the arrow, and in this way, the radio waves E2 are emitted obliquely upwards from one end side where the reflecting plate 16b is positioned to the other end side with respect to the shopping basket C.

The RFID antennas 15a and 15b are arranged in such a manner that an intersection point P between the radio waves E1 emitted from the RFID antenna 15a and the radio waves E2 emitted from the RFID antenna 15b is positioned on the center line O extending upwards from the center point of the placement section 11. In this case, it is desirable that an angle formed by the radio waves E1 and E2 from the RFID antennas 15a and 15b is close to a right angle. As a result, the shopping basket C is within the communication range of the radio waves E1 and E2 which are emitted from the RFID antennas 15a and 15b and intersect with each other.

From the above, since the commodities accommodated in the shopping basket C are irradiated with the radio waves E1 and E2 emitted from the RFID antennas 15a and 15b from different directions, the commodity information can be easily read from the commodities.

In FIG. 5-2, the RFID antenna 15b and the reflecting plate 16b are arranged at the same positions as those in FIG. 5-1.

The RFID antenna 15a is arranged below the placement section 11 in such a manner that the emitting plane from which the radio waves E1 are emitted is inclined upwards on one end side on which the reflecting plate 16b is arranged. Therefore, the radio waves E1 from the RFID antenna 15 are emitted obliquely upwards towards the reflecting plate 16b side as indicated by the arrow.

The RFID antennas 15a and 15b are arranged in such a manner that an intersection point P between the radio waves E1 emitted from the RFID antenna 15a and the radio waves E2 emitted from the RFID antenna 15b is positioned on the center line O extending upwards from the center point of the placement section 11. In this case, it is desirable that an angle formed by the radio waves E1 and E2 from the RFID antennas 15a and 15b is close to a right angle. As a result, the shopping basket C is within the communication range of the radio waves E1 and E2 which are emitted from the RFID antennas 15a and 15b and intersect with each other.

From the above, since the commodities accommodated in the shopping basket C are irradiated with the radio waves E1 and E2 emitted from the RFID antennas 15a and 15b from different directions, the commodity information can be easily read from the commodities.

Figure 6:
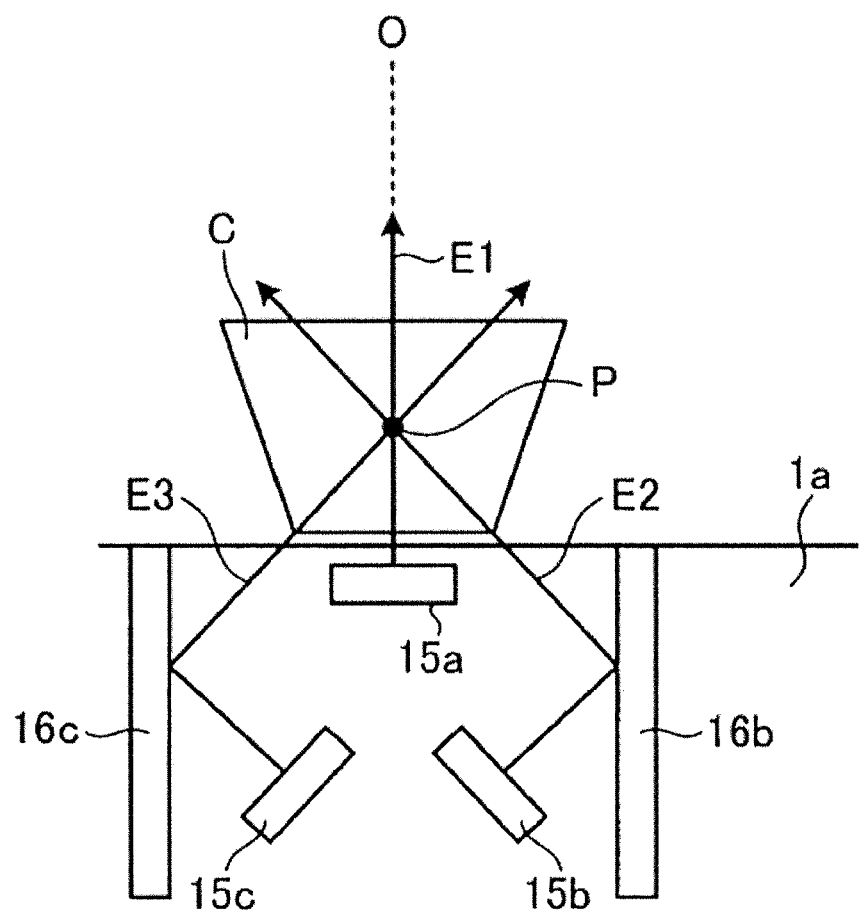
FIG. 6 is a diagram illustrating an example of an arrangement of RFID antennas.
Figure 7:
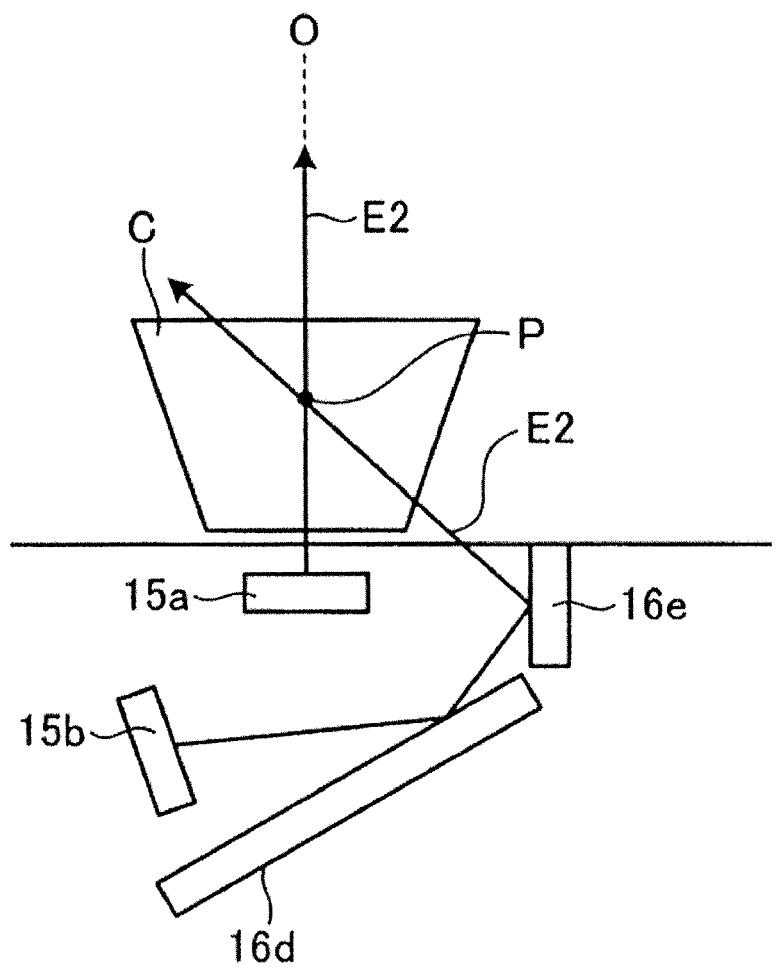
FIG. 7 is an external perspective view illustrating an example of an arrangement of RFID antennas.

In FIG. 6, the RFID antenna 15a is arranged at the same position as that in FIG. 4-1.

In the counter 1a, the reflecting plates 16b and 16c respectively orthogonal to the upper surface of the counter 1a are arranged at both end sides (the right side and the left side of the shopping basket C in FIG. 6) with respect to the shopping basket C. The RFID antenna 15b is arranged at one end side in such a manner that the emitting plane from which the radio waves E2 are emitted is inclined upwards. The radio waves E2 from the RFID antenna 15b are reflected by the reflecting plate 16b as indicated by the arrow, and in this way, the radio waves E2 are emitted obliquely upwards from one end side where the reflecting plate 16b is positioned to the other end side with respect to the shopping basket C.

The RFID antenna 15c is arranged at the other end side in such a manner that the emitting plane from which the radio waves E3 are emitted is inclined upwards. The radio waves E3 from the RFID antenna 15c are reflected by the reflecting plate 16c as indicated by the arrow, and in this way, the radio waves E3 are emitted obliquely upwards from the other end side where the reflecting plate 16c is positioned to one end side with respect to the shopping basket C.

The RFID antennas 15a, 15b and 15c are arranged in such a manner that an intersection point P of the radio waves E1 emitted from the RFID antenna 15a, the radio waves E2 emitted from the RFID antenna 15b and the radio waves E3 emitted from the RFID antenna 15c is positioned on the center line O extending upwards from the center point of the placement section 11. In this case, it is desirable that an angle formed by the radio waves E2 and E3 from the RFID antennas 15b and 15c is close to a right angle. As a result, the shopping basket C is within the communication range of the radio waves E1, E2 and E3 which are emitted from the RFID antennas 15a, 15b and 15c and intersect with each other.

From the above, since the commodities accommodated in the shopping basket C are irradiated with the radio waves E1, E2 and E3 emitted from the RFID antennas 15a, 15b and 15c from different directions, the commodity information can be easily read from the commodities.

In FIG. 7, the RFID antenna 15a is arranged at the same position as that in FIG. 4-1.

In the counter 1a, the reflecting plate 16e orthogonal to the upper surface of the counter 1a is arranged at one end side (the right side of the shopping basket C in FIG. 7) with respect to the shopping basket C. Furthermore, the reflecting plate 16d forming an angle with the reflecting plate 16e is arranged. Specifically, the reflecting plate 16d is not parallel to or orthogonal to the upper surface of the counter 1a and the reflecting plate 16e, but is inclined downwards from the one end side to the other end side (the left side of the shopping basket C in FIG. 7). The RFID antenna 15b is arranged at the other end side in such a manner that the emitting plane from which the radio waves E2 are emitted is inclined upwards. The radio waves E2 from the RFID antenna 15b are first emitted obliquely upwards, reflected by the reflecting plate 16b and then reflected by the reflecting plate 16e as indicated by the arrow, and in this way, the radio waves E2 are emitted obliquely upwards from one end side where the reflecting plate 16e is positioned to the other end side with respect to the shopping basket C.

The RFID antennas 15a and 15b are arranged in such a manner that an intersection point P between the radio waves E1 emitted from the RFID antenna 15a and the radio waves E2 emitted from the RFID antenna 15b is positioned on the center line O extending upwards from the center point of the placement section 11. In this case, it is desirable that an angle formed by the radio waves E1 and E2 from the RFID antennas 15a and 15b is close to a right angle. As a result, the shopping basket C is within the communication range of the radio waves E1 and E2 which are emitted from the RFID antennas 15a and 15b and intersect with each other.

From the above, since the commodities accommodated in the shopping basket C are irradiated with the radio waves E1 and E2 emitted from the RFID antennas 15a and 15b from different directions, the commodity information can be easily read from the commodities.

As described above, in the self-checkout apparatus 1 according to at least one embodiment, two or more RFID antennas 15a, 15b, and 15c are embedded below the counter 1a. The RFID antennas 15a, 15b and 15c are arranged with the emitting planes of the radio waves in different directions. Depending on the arrangement positions of the RFID antennas 15a, 15b and 15c, the reflecting plates 16a to 16e are provided to reflect the emission directions of the emitted radio waves E1, E2 and E3. Then, with the radio waves E1, E2 and E3 emitted from the RFID antennas 15a, 15b and 15c, the commodity information is read from the RFID tags attached to commodities accommodated in the shopping basket C placed on the placement section 11. By emitting radio waves from different directions in this manner, it is possible to read the commodity information of all the commodities, thereby improving the operability, shortening the reading time of the commodity information and improving a reading rate of the commodity information. Since the upper surface of the counter 1a is flat without being provided with fences or the like, it is easy to place the shopping basket C on the placement section 11, and the customer does not have a feeling of pressure.

Furthermore, it is possible to reduce a null area by reflecting the radio waves E2 and E3 emitted from the RFID antennas 15b and 15c by the reflecting plates 16b, 16c, 16d and 16e to irradiate the shopping basket C, thereby ensuring an effective range of radio waves for reading the commodity information. By using the reflecting plates 16b, 16c, 16d and 16e, the reading apparatus 10 can be miniaturized.

In some above embodiments, the checkout processing apparatus 2 is provided with the input reception section 202 and the display controller 201; however, the present invention is not limited thereto, and the reading apparatus 10 may be provided with the input reception section 202 and the display controller 201. In this case, the communication controller 203 and the communication controller 303 can perform the sales registration and the checkout processing on the commodity by transmitting and receiving various kinds of information between the reading apparatus 10 and the checkout processing apparatus 2.

The program executed by the reading apparatus 10 according to at least one embodiment is provided by being incorporated in a ROM or the like in advance. The program executed by the reading apparatus 10 of at least one embodiment may be provided by being recorded in a computer-readable storage medium such as a CD-ROM (Compact Disc Read-Only Memory), a FD (Flexible Disk), a CD-R (Compact Disc Rewritable), a DVD (Digital Versatile Disk) or the like in a file of an installable format or executable format.

Furthermore, a program executed by the reading apparatus 10 of at least one embodiment may be stored in a computer connected to a network such as the Internet and provided by being downloaded via the network. The program executed by the reading apparatus 10 of at least one embodiment may be provided or distributed via a network such as the Internet.

The program executed in the reading apparatus 10 of the present embodiment has a module configuration including the above-mentioned respective sections (the reader/writer controller and the communication controller). The CPU (processor) reads out the program from the storage medium and loads the respective sections on a main storage device. As a result, the above sections are generated on the main storage device.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A reading apparatus for reading commodity information relating to a commodity from a wireless tag attached to the commodity, comprising:
a placement section configured to support the commodity;
a first antenna configured to emit first radio waves in a first direction facing the placement section;
one or more second antennas configured to emit second radio waves in a second direction, the one or more second antennas are arranged below the first antenna in such a manner that the first direction is different from the second direction and the first radio waves emitted from the first antenna intersect with the second radio waves emitted from the one or more second antennas;
a reflection member configured to reflect the second radio waves emitted from the one or more second antennas; and
a reading controller configured to read the commodity information from the wireless tag of each commodity placed on the placement section with at least one of the first antenna or the one or more second antennas.

2. The reading apparatus according to claim 1, wherein the first antenna and the one or more second antennas are provided below the placement section.

3. The reading apparatus according to claim 2, wherein the refection member is provided below the placement section.

4. The reading apparatus according to claim 2, wherein the first antenna and the one or more second antennas are arranged in such a manner that an intersection point at which the first radio waves emitted from the first antenna and the second radio waves emitted from the second antenna intersect with each other is positioned on a center line extending upwards from a center point of the placement section.

5. The reading apparatus according to claim 1, wherein the refection member is provided below the placement section.

6. The reading apparatus according to claim 1, wherein the reflection member includes a first reflection plate parallel to a horizontal surface of the placement section.

7. The reading apparatus according to claim 6, wherein the reflection member includes a second reflection plate arranged perpendicular to the first reflection plate, wherein the second radio waves from the one or more second antennas reflect off the second reflection plate and then the first reflection plate.

8. The reading apparatus according to claim 1, wherein the first radio waves emitted from the first antenna and the second radio waves emitted from the one or more second antennas intersect with each other at about 90°.

9. The reading apparatus according to claim 1, wherein a first portion the second radio waves emitted from one of the one or more second antennas and a second portion of the second radio waves emitted from another of the one or more second antennas intersect with each other at about 90°.

10. A checkout apparatus comprising:
a reading apparatus for reading commodity information relating to a commodity from a wireless tag attached to the commodity; and
a check out processing apparatus configured to perform checkout processing based on the read commodity information,
the reading apparatus comprising:
  a placement section configured to support the commodity;
  a first antenna configured to emit first radio waves in a first direction facing the placement section;
  one or more second antennas configured to emit second radio waves in a second direction, the one or more second antennas are arranged below the first antenna in such a manner that the first direction is different from the second direction and the first radio waves emitted from the first antenna intersect with the second radio waves emitted from the one or more second antennas;
  a reflection member configured to reflect the second radio waves emitted from the one or more second antennas; and
  a reading controller configured to read the commodity information from the wireless tag of each commodity placed on the placement section with at least one of the first antenna or the one or more second antennas.

11. The checkout apparatus according to claim 10, wherein
the first antenna and the one or more second antennas are provided below the placement section.

12. The checkout apparatus according to claim 11, wherein
the refection member is provided below the placement section.

13. The checkout apparatus according to claim 11, wherein
the first antenna and the one or more second antennas are arranged in such a manner that an intersection point at which the first radio waves emitted from the first antenna and the second radio waves emitted from the second antenna intersect with each other is positioned on a center line extending upwards from a center point of the placement section.

14. The checkout apparatus according to claim 10, wherein
the refection member is provided below the placement section.

15. The checkout apparatus according to claim 10, wherein the reflection member includes a first reflection plate parallel to a horizontal surface of the placement section.

16. The checkout apparatus according to claim 15, wherein the reflection member includes a second reflection plate arranged perpendicular to the first reflection plate, wherein the second radio waves from the one or more second antennas reflect off the second reflection plate and then the first reflection plate.

17. The checkout apparatus according to claim 10, wherein the first radio waves emitted from the first antenna and the second radio waves emitted from the one or more second antennas intersect with each other at about 90°.

18. The checkout apparatus according to claim 10, wherein a first portion of the second radio waves emitted from one of the one or more second antennas and a second portion of the second radio waves emitted from another of the one or more second antennas intersect with each other at about 90°.

* * * * *